United States Patent

[11] 3,574,413

| [72] | Inventor | Arthur B. Euga<br>728½ Franklin Ave., Columbus, Ohio 43205 |
|---|---|---|
| [21] | Appl. No. | 282,525 |
| [22] | Filed | Apr. 29, 1963 |
| [45] | Patented | Apr. 13, 1971<br>Continuation of application Ser. No. 788,480, Jan. 6, 1959, now abandoned, which is a division of application Ser. No. 564,315, Feb. 8, 1956, now Patent No. 2,871,827, which is a continuation-in-part of application Ser. No. 176,785, July 31, 1950, now abandoned. |

[54] BRAKE SYSTEM FOR VEHICLES
2 Claims, 4 Drawing Figs.

[52] U.S. Cl. .................................... 303/7,
188/152, 303/2, 303/9, 303/13
[51] Int. Cl. ...................................... B60t 13/36
[50] Field of Search .......................... 303/2, 9,
13, 7; 188/151.11, 152.02; 92/63

[56] References Cited
UNITED STATES PATENTS

| 1,987,435 | 1/1935 | Engel | 303/13X |
|---|---|---|---|
| 2,240,166 | 4/1941 | Stanley | 303/2 |
| 2,366,606 | 1/1945 | Fites | 303/7 |
| 2,776,734 | 1/1957 | Hackett | 188/151.11 |
| 2,171,827 | 2/1959 | Euga | 92/50 |
| 2,409,908 | 10/1946 | Simpkins | 303/9UX |
| 2,976,085 | 3/1961 | Grogan | 303/9 |
| 2,240,166 | 4/1941 | Stanley | 303/2UX |
| 3,010,767 | 11/1961 | Euga | 303/2 |
| 3,093,421 | 6/1963 | Euga | 303/2 |
| 3,107,583 | 10/1963 | Woodward | 92/63 |
| 3,131,609 | 5/1964 | Dobrikin et al. | 92/63 |

FOREIGN PATENTS

| 474,948 | 2/1953 | Italy | 303/9 |

*Primary Examiner*—Milton Buchler
*Assistant Examiner*—John J. Mclaughlin

ABSTRACT: A dual reservoir airbrake system wherein both a main fluid pressure system and an auxiliary fluid pressure system can supply pressure to a first and second movable wall motor. The disclosure particularly relates to brake systems where valve-protected reservoir pressure supplant each other to produce from such a motor push rod pressure when the main or auxiliary brake pressure system becomes disabled failing temporarily or completely.

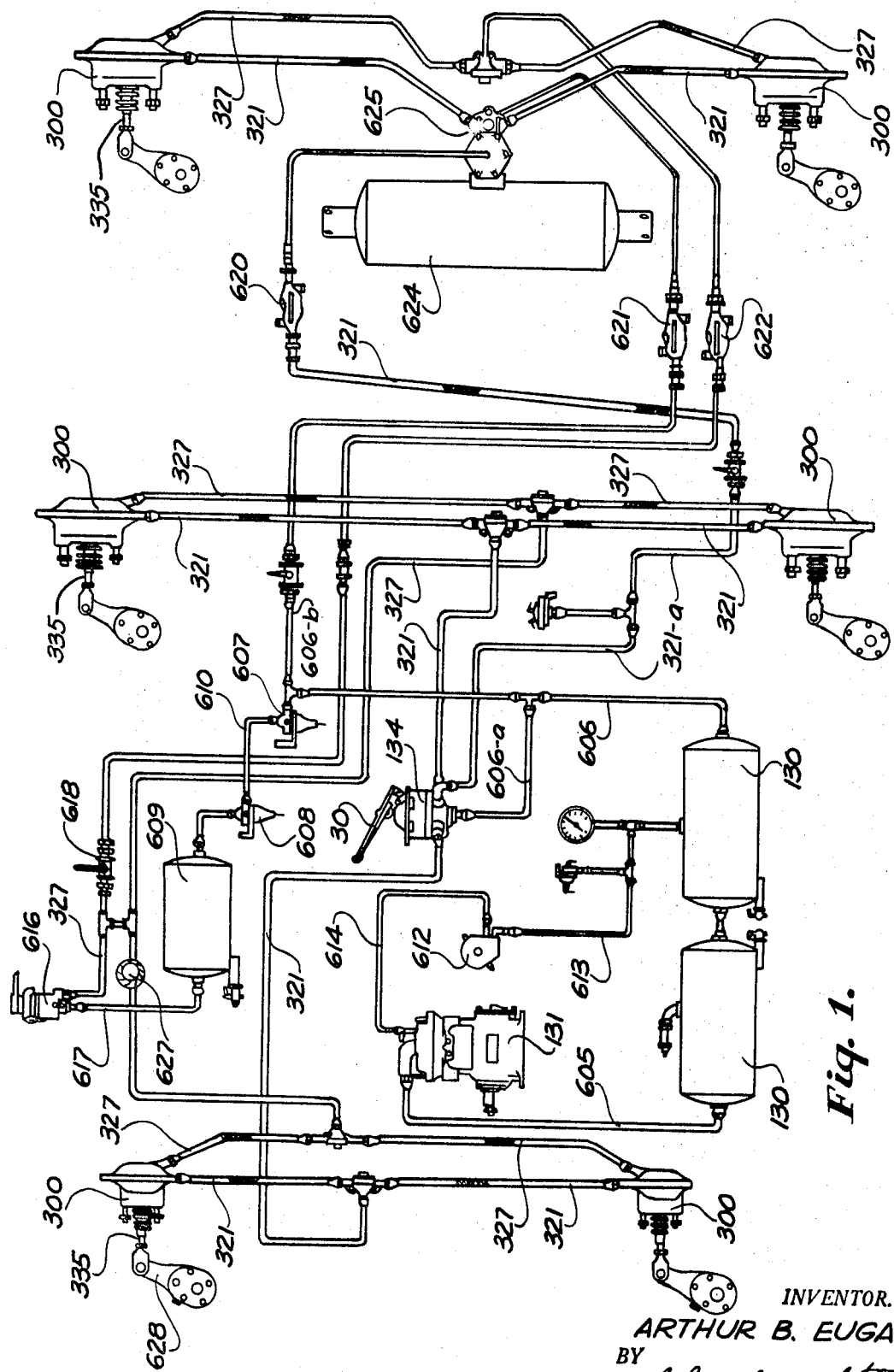
Fig. 1.
INVENTOR.
ARTHUR B. EUGA
BY
ATTORNEYS

INVENTOR.
ARTHUR B. EUGA

BRAKE SYSTEM FOR VEHICLES

The present application is a continuation of my application Ser. No. 788,480, filed Jan. 6, 1959, now abandoned which is a division of my application Ser. No. 564,315, filed Feb. 8, 1956, now U.S. Pat. No. 2,871,827 which is a continuation-in-part of my application Ser. No. 176,785, filed Jul. 31, 1950, now abandoned and relates to certain modifications and improvements of the systems disclosed therein.

This application relates generally to braking systems for vehicles of the type wherein auxiliary braking means are provided for actuating the brake mechanisms upon failure of the service braking system in controlled operation of the vehicle brake assembly to properly pressurize motors to operate its wheel brakes.

One object of the invention, therefore, is the provision of a novel means adaptable for instantly supplementing the fluid action of the service braking means upon partial loss of the serving fluid therefor.

It is another object of the present invention to provide a novel airbrake cylinder of improved construction which incorporates flexible diaphragm means separating a service brake chamber from an auxiliary chamber which airbrake cylinder incorporates novel safety means for preventing failure of said flexible diaphragm means separating said chambers.

Further objects and advantages of the present invention will be apparent from the following description, reference being had to the accompanying drawings wherein preferred forms of embodiments of the invention are clearly shown.

In The Drawings:

FIG. 1 illustrates a brake system constructed according to the present invention and adapted for use upon single and multiple coupled vehicles.

Figure 2:
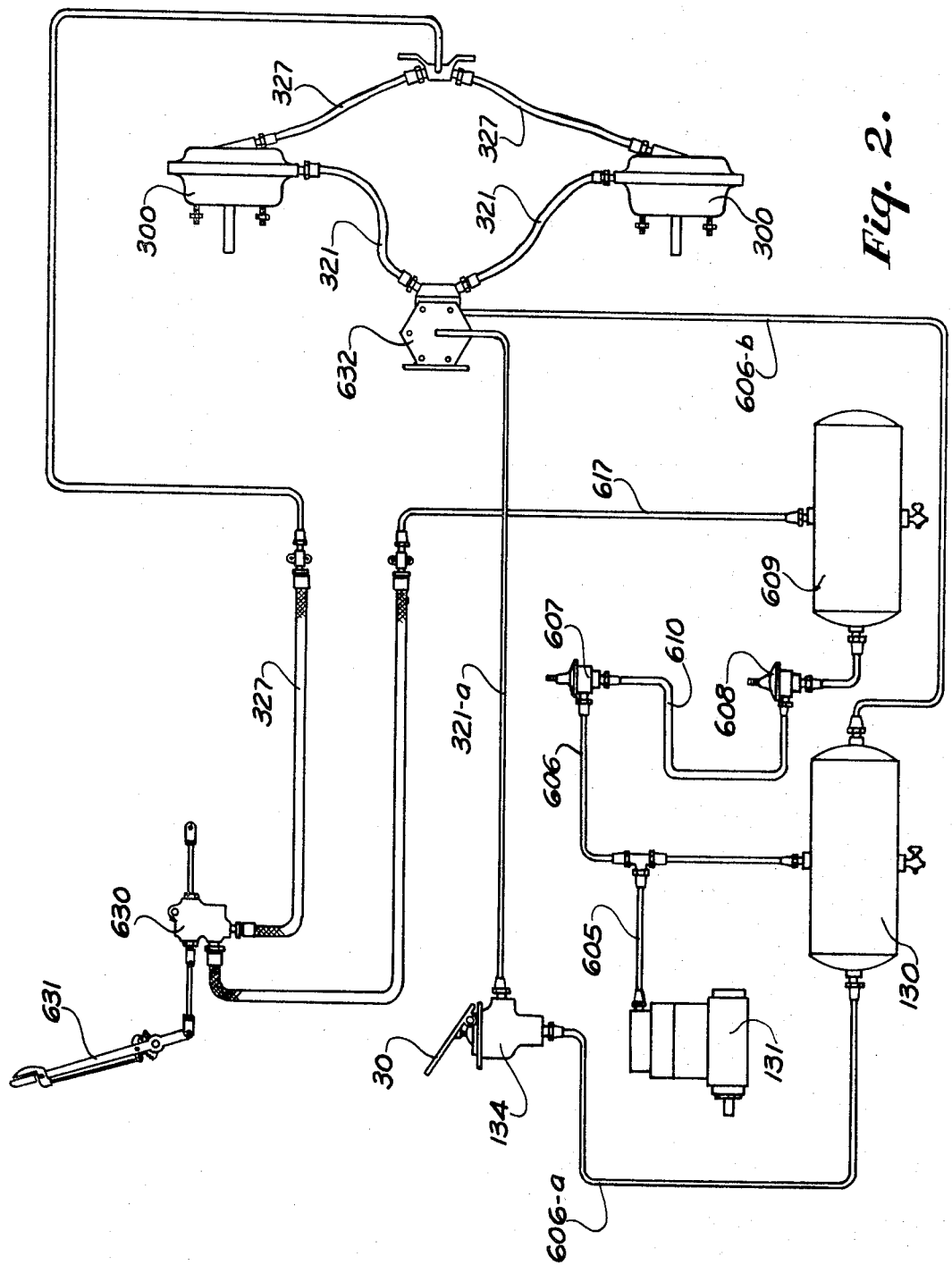
FIG. 2 is a schematic view of a typical brake system provided with a manually operated valve for delivering and holding pressures.
Figure 3:
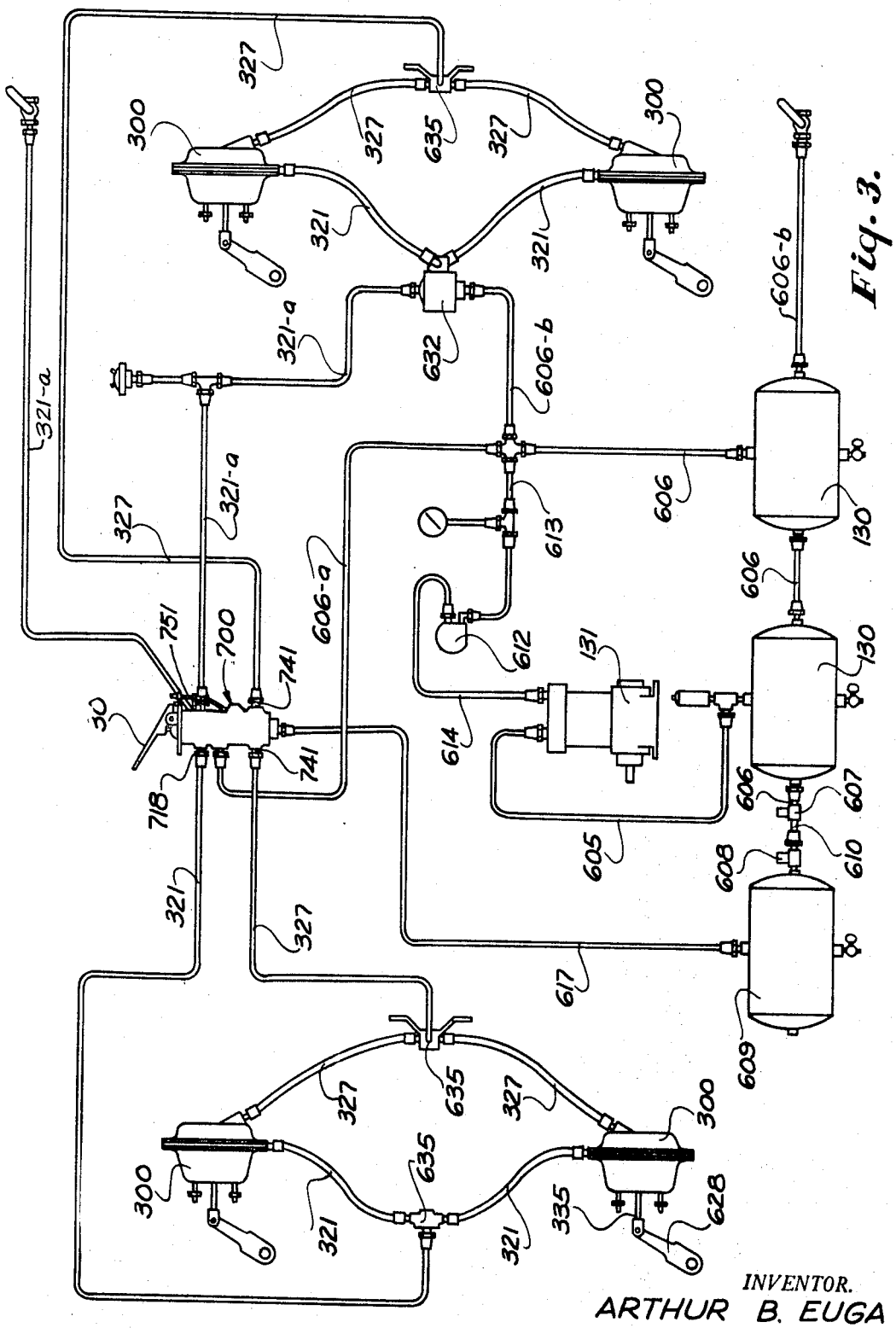
FIG. 3 illustrates a brake system constructed according to the present invention and adapted for use with the novel valve mechanism of FIG. 4.

Reference is next made to the airbrake system of FIG. 1, which system is adapted for use with the brake motor cylinder-type 300 indicated in connection with the other two brake systems illustrated in FIGS. 2 and 3.

As seen in FIG. 1, a compressor 131 supplies air through line 605 to service reservoir 130. Air from service reservoir 130 passes through line 606 to first pressure regulator valve 607. When the pressure in service reservoir 130 and line 606 reaches a predetermined value, such as 85 p.s.i., regulator valve 607 opens and air passes through a second pressure regulator valve 608 to an auxiliary reservoir 609.

Second pressure regulator valve 608 is adapted to be opened by a lesser air pressure, such as 65 p.s.i., whereby air will readily pass through such second pressure regulator valve 608.

Both the pressure regulator valves 607 and 608 are well known to the art and are a type of valve which permits fluid to flow only in one direction, and only when the pressure reaches some minimum predetermined value at which the valve is opened by fluid pressure.

The two pressure regulator valves 607 and 608 are connected by a conduit 610. Two valves are provided so that if one of the valves 607 or 608 ruptures, both of the reservoirs 130 and 609 will not drain to atmosphere. For example, if only valve 607 should rupture, only service reservoir 130 is lost to atmosphere, or if only valve 608 ruptures, only auxiliary reservoir 609 is lost to atmosphere.

When the desired operating pressure is reached in the reservoirs, a governor 612, of a conventional type well known to the art, senses such operating pressure and vents line 614 which in turn operates a valve in the compressor that prevents the compressor 131, which is continuously driven, from continuing to pressurize the reservoirs.

Assuming both reservoir 130 and 609 are fully charged with air, in the manner previously described, normal braking action is affected by depressing pedal lever 30 which lever actuates brake valve 134 to release air from service reservoir 130 through lines 321 to the various service brake chambers of brake cylinders 300.

Brake valve 134 is of a conventional type, well known to the art, and functions to meter air to the service brake chambers at a controlled rate.

In the event service brake valve 134 is actuated, with a failure in pressure availability in the service brake circuit, a hand-operated brake valve 616 is actuated to release air from auxiliary reservoir 609, through line 617, valve 616, and lines 327 to the auxiliary chambers of airbrake cylinders 300.

It will be noted in FIG. 1, that a manually operated shutoff valve 618 is provided in line 327 leading to the brake cylinders of the trailer or trailers being towed by the tractor. Valve 618 is mounted in the cab of the tractor within reach of the driver so that in the event a trailer or trailers should break away from the tractor and sever the lines between the tractor and trailer, which are shown coupled at 620, 621, and 622, then, in that the event the driver can conserve his air supply in auxiliary reservoir 609 by closing the previously mentioned shutoff valve 618.

With continued reference to FIG. 1, the trailer circuit shown to the right of couplings 620, 621, and 622 includes a trailer reservoir 624. Line 606–b of the trailer circuit is always charged with reservoir pressure and connects to an emergency relay valve 625, of a conventional type known to the art, which valve feeds air to trailer reservoir 624. Emergency relay valve 625 further serves the function of releasing air through lines 321 to the service chambers of the trailer brake cylinders when the trailer service line 620 is energized by pedal lever 30. In the event of a trailer breakaway, emergency relay valve 625 serves the additional function of releasing air from trailer reservoir 624 through line 321 to the service chambers of trailer brake cylinders 300. When this occurs the port in valve 625 communicating with line 606–b is automatically closed.

As seen in FIG. 1, the line 327 leading to the front axle brake cylinders 300 is provided with front-axle-limiting valve 627 for proportionally decreasing the air pressure applied to the front brake cylinders when the auxiliary brake system is energized. Pressure-limiting valve 627 is located in the cab of the tractor whereby the driver can manually set same to various proportional settings. Hence the driver is able to control the relative braking effect applied at the front axle of the tractor on the push rod 335 as compared to the braking effect applied at the rear axle of the tractor when the emergency hand valve 616 is actuated.

Each of the brake cylinders 300 of FIG. 1 includes a previously described brake-actuating rod 335 which is connected to a conventional slack adjuster 628 which in turn operates a conventional cam rod that actuates the brake shoes of the vehicle.

Reference is next made to FIG. 2 which illustrates a simplified emergency system for the rear axle only of a tractor or truck. Elements of this system which are identical to corresponding elements of the system of FIG. 1 are designated by identical numerals. In operation, compressor 131 charges service reservoir 130 through line 605 and line 606 charges auxiliary reservoir 609 through pressure regulator valves 607 and 608 connected by line 610. These valves 607 and 608 function in the manner previously described in connection with the system of FIG. 1.

When service brake valve 134 is actuated by lever 30, in normal operation of the service brake system, air is released from the service reservoir 130 through line 606–a, valve 134, line 321–a to a relay valve 632. This action deflects a diaphragm, not illustrated, in relay valve 632 which opens a valve to connect service reservoir 130 through line 606–b to lines 321 whereby air is delivered directly to the service brake chambers of brake cylinders 300.

Relay valve 632 is of a conventional type well known to the art, and serves the function of sensing pressure through line 321–a to effect quick delivery of air through a relatively short delivery circuit connecting the service brake reservoir with the air cylinders 300. Relay valve 632 is also provided with a quick release mechanism whereby air can be quickly released from the service brake chambers of cylinders 300.

In the event of failure of the service brake circuit of FIG. 2, manually operated lever 631, which may be the handbrake lever of the truck or tractor, is actuated to operate a normally closed valve 630 whereby air is released from auxiliary reservoir 609 through line 617, valve 630, and lines 327 to the auxiliary chambers of brake cylinders 300.

When the hand lever 631 is released by overtravel past closed position, after an emergency stop, a vent in valve 630 is opened whereby air is vented from auxiliary brake chamber in brake cylinders 300, through lines 327 and valve 630 to atmosphere.

Moreover, with the two pressure regulator valves 607 and 608 being utilized as taught herein, failure of one of such valves will drain only one of the service or auxiliary systems, as described in connection with the system of FIG. 1. Referring next to FIG. 3, a third brake system is illustrated which utilizes the novel valve mechanism 700 of FIG. 4. Air from compressor 131 is delivered through line 605 to service reservoir 130 and thence through line 606 and pressure regulator valves 607 and 608 to auxiliary reservoir 609 whereby the reservoirs are charged in the manner previously described.

When lever 30 is depressed, during normal operation of the service brake circuit of FIG. 3, air is released from service brake reservoir 130 through lines 606, 606–a, passage 718 of valve 700, and lines 321 to the service brake chambers of front brake cylinders 300. Air is also released through line 321–a to relay valve 632 which valve releases air directly from reservoir 130, line 606, line 606–b, valve 632 and lines 321 to the service brake chambers of rear brake cylinders 300.

Figure 4:
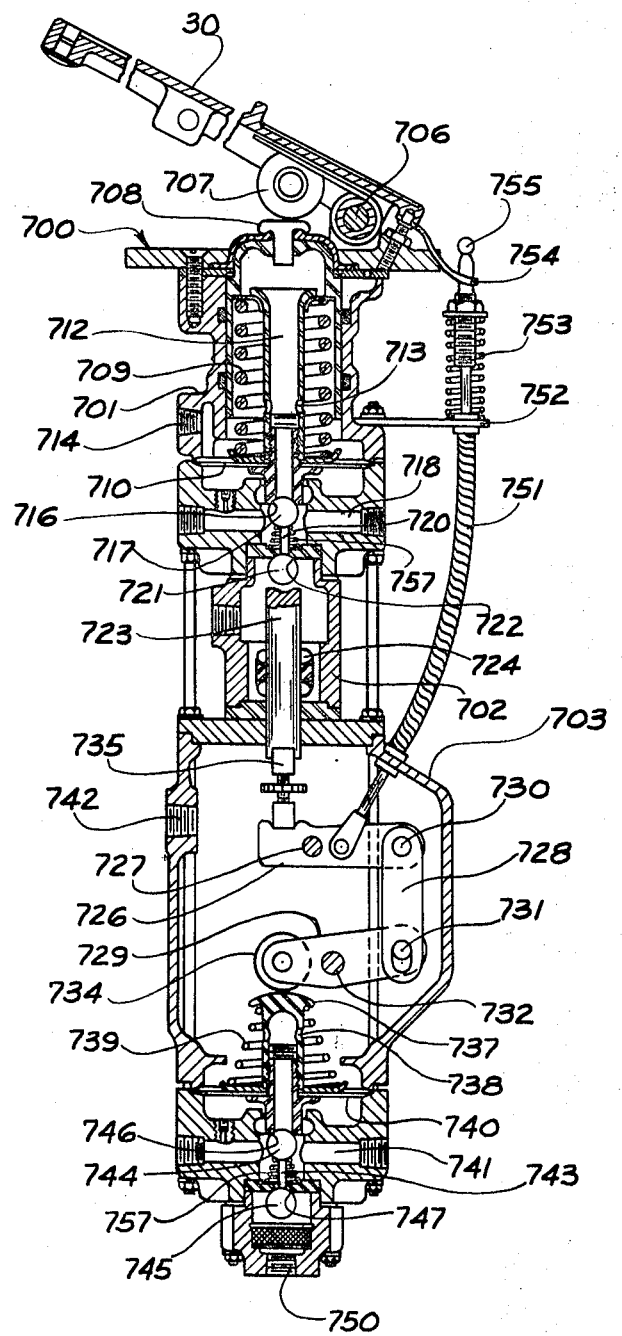
FIG. 4 is a side-sectional view of novel valve mechanism constructed according to the present invention and adapted for use in the brake system of FIG. 3.

Upon failure of the service brake circuit of FIG. 3, when pedal lever 30 is depressed to a predetermined position at which the service brakes would ordinarily be actuated, no braking will occur in the service brake chambers of brake cylinders 300. Upon further movement, however, of pedal lever 30 beyond said predetermined position, an auxiliary valve mechanism, later to be described in connection with FIG. 4, is caused to open whereby air can be released, in a controlled manner from auxiliary reservoir 609 through line 617, passage 741, and lines 327 to the auxiliary brake chambers of wheel cylinders 300.

The system of FIG. 3 is also provided with quick release valves 635 located in lines 327 close to the wheel cylinders 300. These quick release valves 635 may be of the type well known to the art for use in service brake circuits, but in the system of the present invention these quick release valves 635 are incorporated in the auxiliary circuit in combination with the automatic valve mechanism 700, later to be described, in order to allow the driver of the vehicle to quickly release the auxiliary emergency brake circuit by merely decreasing foot pressure on the pedal lever 30. Such release of the pressure being applied to the auxiliary circuit and chambers is effected, with the present valve mechanism 700, in a controlled manner whereby the braking effect can be gradually applied or released, as required by the particular driving operation. This controlled operation is obtained, with valve mechanism 700, both in instance where a partial loss in the pressure in the service brake chambers occurs and instances where a complete loss of pressure in the service brake chambers occurs. Referring next to FIG. 4 the novel valve mechanism 700 used in connection with the system of FIG. 3 comprises a first casing portion 701, a second casing portion 702, and a third casing portion 703. Upper casing portion 701 carries an actuating lever 30 pivoted at 706 and provided with a roller 707 arranged to depress sleeve 708 downwardly against the section of spring 709. The lower end of spring 709 engages a diaphragm 710 the periphery of said diaphragm is supported by casing portion 701. A tube 712 extends through diaphragm 710 and includes vent holes 713 which connect the interior of tube 712 with atmosphere at the vent 714. The lower end of tube 712 includes a seat 716 engaged by exhaust valve portion 717 movably disposed in passage 718 leading to service brake chambers of the vehicle.

The movable element 720 also includes an intake valve portion 721 arranged to move upwardly against a seat 722.

The lower end of movable element 720 is engaged by the upper end of a plunger 723 which is slidably carried by casing portion 702 at a seal 724. The lower end of plunger 723 engages a lever 726 pivoted at 727 and pinned to link 728 at 730. The other end of link 728 is pinned to a second lever 729 at pin 731. Lever 729 is pivoted to casing portion 703 at a pivot 723 and carried a roller 734 which engages the upper end of tube 737. A spring 739 urges tube 737 upwardly with the lower end of tube 737 being secured to the center of diaphragm 740. The periphery of diaphragm 740 is mounted to casing portion 703.

The lower end of tube 737 includes a seat 746 adapted to receive exhaust valve portion 744 of movable element 743. The wall tube 737 includes holes 738 which communicate with a vent 742 through the wall of casing portion 703.

The exhaust valve portion 744 of movable element 743 is disposed in passage 741 leading to the auxiliary brake chambers of the vehicle. The intake valve portion 745 of movable element 743 is arranged to engage a seat 747 between passage 741 and intake passage 750, the latter being in communication with the auxiliary reservoir.

Each of the movable elements 720 and 743 is urged upwardly by a small compression spring 757. A cable 751 is attached at its lower end to lever 726.

The upper end of cable 751 extends through a hole in bracket 752 and is provided with a ball 755. An arm 754 mounted on lever 30 is engageable with ball 755 whereby tension is applied to cable 751 upwardly at all times.

In operation of the valve mechanism 700, when lever 30 is depressed, and the service brake system is operating normally, the roller 708 depresses spring 709 and tube 712 whereby the intake valve portion 721 is depressed away from seat 722 whereby air is released from the service brake reservoir to the service brake cylinders of the vehicle with exhaust valve portion 717 being closed against seat 716. The amount the brake lever 30 is moved towards the fully applied position, or the position at which it is held, determines in exact relative proportion the air pressure delivered to and held in the brake chambers. This is true because the force from air pressure on the lower side of diaphragm 710, is equalized by the force applied to the upper side of diaphragm 710 by the action of lever 30 transmitted to the diaphragm 710 through spring 709.

It should be pointed out that this type of valve includes a certain amount of travel over which the air application is gradually increased to some predetermined maximum pressure. Any further movement of the lever 30 and valve may be considered free travel during which full reservoir pressure is delivered to the brake chambers.

When lever 30 is actuated, and a failure of the service brake system occurs, such that sufficient braking pressure is not available from the service brake reservoir, when the lever 30 reaches a predetermined pressure point, at which full reservoir pressure would be available at passage 718, then the plunger 723 actuated lever 726, link 728, and lever 729 to depress tube 737 whereby the lower movable element 743 is moved downwardly. This causes intake valve portion 745 to depart from seat 747 and air is thereby released from the auxiliary reservoir to the auxiliary brake chambers. The operation of the lower auxiliary valve mechanism, which includes the movable element 743, is substantially identical to that of the upper service brake valve mechanism previously described. When exhaust valve portion 744 is closed and intake valve portion 745 is open, the force exerted by air pressure on the lower side of diaphragm 740 will equal the force applied to the upper side of diaphragm 740 by the action of lever 30 transmitted through the linkage previously described.

When braking action is being applied to the service air chambers from passage 718 of valve mechanism 700, and it is desired to decrease the braking action, when the operator decreased the depression of lever 30, seat 716 will lift away from exhaust valve portion 717 whereby air is allowed to escape from the service brake chambers, through passage 718, tube 712, holes 713 and vent 714 to the atmosphere.

When braking action is being applied to the auxiliary air chambers from passage 741 of the valve mechanism 700, and the operator decreased the depression of lever 30, seat 746 is lifted away from exhaust valve portion 744 whereby air is allowed to escape from the auxiliary brake chambers, through passage 741, tube 737, holes 738 and vent 742 to atmosphere.

The cable 751 may be incorporated in the valve mechanism 700, in the manner previously described, to provide positive and direct mechanical linkage between lever 30 and movable valve element 743. Hence if the spring 712 of the service valve mechanism should break or become inoperative, the auxiliary valve mechanism will still be actuated when lever 30 is depressed.

From the above it will be understood that with valve mechanism 700, applied to a system such as is illustrated in FIG. 3, not only is the air supply to the service brake chamber increased or decreased in a controlled, metered manner, but, in addition, when the auxiliary brake system is automatically energized, the air supply to the auxiliary brake chambers is increased or decreased in the same controlled, metered manner, by the same foot-actuated lever. Hence it will be understood that when the service brake system, for any reason fails completely, or becomes inadequate, the auxiliary system automatically comes into play to give the driver not only the identical stopping power, but also the identical control he enjoyed prior to the failure of the service brake system.

While the forms of embodiments of the present invention as herein disclosed constitute preferred forms, it is to be understood that other forms might be adopted, all coming within the scope of the claims which follow:

I claim:

1. A brake system for vehicles comprising reservoir means including a service brake reservoir for supplying pressurized service fluid to a brake motor and an auxiliary brake reservoir for supplying pressurized auxiliary fluid to said brake motor; a tractor brake motor including a casing, a first moveable wall forming a portion of the confines of a tractor service brake chamber, a second moveable wall forming the confines of a tractor auxiliary brake chamber, and a push rod operated by said moveable walls; valve means including a service valve for releasing service fluid to said service chamber and an auxiliary valve for releasing auxiliary fluid to said auxiliary chamber, a manual actuator for said service valve means; a manual actuator for said auxiliary valve means; a trailer brake motor including a first moveable wall forming a portion of the confines of a trailer service brake chamber, a second moveable wall forming the confines toward trailer auxiliary brake chamber, and a push rod operated by said moveable walls; relay emergency valve means for controlling the flow of pressurized fluid to said trailer service brake chamber; conduit means connecting said trailer auxiliary brake chamber with said reservoir means; and limiting valve means for proportionally decreasing the air pressure applied to the tractor brake motor as compared to the trailer brake motor when said auxiliary brake chambers are energized.

2. A brake system for vehicles comprising reservoir means including a service brake reservoir for supplying pressurized service fluid to a brake motor and an auxiliary brake reservoir for supplying pressurized auxiliary fluid to said brake motor; a tractor brake motor including a casing, a first moveable wall forming a portion of the confines of a tractor service brake chamber, a second moveable wall forming the confines of a tractor auxiliary brake chamber, and a push rod operated by said moveable walls; valve means including a service valve for releasing service fluid to said service chamber and an auxiliary valve for releasing auxiliary fluid to said auxiliary chamber, a manual actuator for said auxiliary valve means; a trailer brake motor; a relay emergency valve means for controlling the flow of pressurized fluid to said trailer brake motor; conduit means connecting said reservoir means with said relay emergency valve means; and limiting valve means for proportionally decreasing the air pressure applied to the tractor brake motor as compared to the trailer brake motor when said auxiliary brake chambers are energized.